United States Patent
Kim et al.

(10) Patent No.: US 11,928,054 B1
(45) Date of Patent: Mar. 12, 2024

(54) ELECTRONIC DEVICE AND COMPUTING SYSTEM INCLUDING SAME

(71) Applicant: MetisX CO., Ltd., Yongin-si (KR)

(72) Inventors: Ju Hyun Kim, Yongin-si (KR); Jin Yeong Kim, Yongin-si (KR); Jae Wan Yeon, Yongin-si (KR)

(73) Assignee: METISX CO., LTD., Yongin-si (KR)

( * ) Notice: Subject to any disclaimer, the term of this patent is extended or adjusted under 35 U.S.C. 154(b) by 0 days.

(21) Appl. No.: 18/481,784

(22) Filed: Oct. 5, 2023

(30) Foreign Application Priority Data

Apr. 19, 2023 (KR) .................. 10-2023-0051363

(51) Int. Cl.
    *G06F 12/02* (2006.01)
(52) U.S. Cl.
    CPC .. *G06F 12/0292* (2013.01); *G06F 2212/1044* (2013.01)
(58) Field of Classification Search
    CPC ............... G06F 12/0292; G06F 2212/1044
    See application file for complete search history.

(56) References Cited

U.S. PATENT DOCUMENTS

| | | | | |
|---|---|---|---|---|
| 2009/0112949 | A1* | 4/2009 | Ergan ................. | G06F 12/0802 |
| 2015/0089121 | A1* | 3/2015 | Coudhury ........... | G06F 12/0804 |
| | | | | 711/103 |
| 2018/0329830 | A1* | 11/2018 | Senior ................. | G06F 12/1036 |

FOREIGN PATENT DOCUMENTS

| | | | |
|---|---|---|---|
| KR | 10-2012-0117612 | A | 10/2012 |
| KR | 10-2013-0046459 | A | 5/2013 |
| KR | 10-1663437 | B1 | 10/2016 |
| KR | 10-1824612 | B1 | 2/2018 |
| KR | 10-2018-0034079 | A | 4/2018 |
| KR | 10-2020-0114483 | A | 10/2020 |
| KR | 10-2021-0085413 | A | 7/2021 |
| KR | 10-2022-0048871 | A | 4/2022 |
| KR | 10-2022-0101847 | A | 7/2022 |
| KR | 10-2022-0116650 | A | 8/2022 |
| KR | 10-2509987 | B1 | 3/2023 |

OTHER PUBLICATIONS

Request for submission of action for KR 10-2023-0051363 dated May 23, 2023.
Written decision on registration for KR 10-2023-0051363 dated Jul. 6, 2023.

* cited by examiner

*Primary Examiner* — Aracelis Ruiz
(74) *Attorney, Agent, or Firm* — Sughrue Mion, PLLC

(57) ABSTRACT

As one aspect of the present disclosure, an electronic device is disclosed. The device may include: a volatile memory device; and a controller configured to be connected with a host processor and the volatile memory device, wherein the controller may be further configured to receive a request related to data access from the host processor, determine whether data corresponding to address information is compressed based on the address information included in the request, and communicate with the volatile memory device and process the request based on a result of determining whether the data is compressed.

18 Claims, 7 Drawing Sheets

ELECTRONIC DEVICE AND COMPUTING SYSTEM INCLUDING SAME

CROSS-REFERENCE TO RELATED APPLICATION

This application claims priority under 35 U.S.C § 119 to Korean Patent Application No. 10-2023-0051363, filed on Apr. 19, 2023, in the Korean Intellectual Property Office, the entire contents of which is hereby incorporated by reference.

TECHNICAL FIELD

The present disclosure relates to electronic devices and computing systems including the same.

BACKGROUND

There have been problems in providing compression directly and transparently in memories where data could be accessed in units of bytes, such as DRAMs, that it was technically impossible or caused serious performance degradation. In other words, even though compression was actually used in conventional memories, it was difficult for the host to know transparently whether compression was used. Compression is sometimes utilized in storage devices that can access data in block units, but a direct comparison with memories is difficult in that the performance requirements, operation methods, and the like are different from those of memories.

One of the reasons it is difficult to directly support compression in memories is that it is hard to obtain the same amount of gain in storage space as the size saved through compression. Since the size of data is reduced arbitrarily after compression, it is difficult to specify its location in memories in a fixed manner. Further, compressed data must be arranged contiguously well in order to utilize the space well, but since the size is variable, fragmented space is wasted and efficiency is thus reduced. In addition, since compressed data can only be used after it is all decompressed, there is a disadvantage of increasing arbitrary data access delays. Therefore, it is very difficult to directly apply compression to DRAMs that use standards such as DDR4 and DDR5, which generally require high performance and operate with strictly set delays.

Summary

It is a technical object of the present disclosure to provide a device and its structure that provide a larger memory capacity via compression.

It is another technical object of the present disclosure to transparently provide a memory compression function additionally to a device that provides a memory.

It is yet another technical object of the present disclosure for a device including a memory to implement swap-in and swap-out by using a storage device on its own.

It is still another technical object of the present disclosure to provide a cost-effective solution so as to exhibit a level of performance on par with systems that do not use compression, at least in particular circumstances.

The present disclosure may be implemented in a variety of ways, including devices, systems, methods, or computer programs stored on a readable storage medium.

As one aspect of the present disclosure, an electronic device for compressing and storing data is disclosed. The device may include: a volatile memory device; and a controller configured to be connected with a host processor and the volatile memory device, wherein the controller may be further configured to receive a request related to data access from the host processor, determine whether data corresponding to address information is compressed based on the address information included in the request, and communicate with the volatile memory device and process the request based on a result of determining whether the data is compressed.

In one embodiment, the controller may divide and manage the volatile memory device into a temporary memory pool and a compressed memory pool and, manage a first mapping table associated with the temporary memory pool and a second mapping table associated with the compressed memory pool.

In one embodiment, the controller may: determine whether the data is stored in the temporary memory pool based on the first mapping table, and in response to determining that the data is stored in the temporary memory pool, transmit the data to the host processor or store data received in connection with the request from the host processor in the temporary memory pool.

In one embodiment, the request may be a write request, and the controller may set a dirty flag for the data stored in the temporary memory pool, in response to having stored the data received in connection with the request from the host processor in the temporary memory pool.

In one embodiment, the controller may: in response to determining that the data is not stored in the temporary memory pool, determine whether the data is stored in the compressed memory pool based on the second mapping table, and in response to determining that the data is stored in the compressed memory pool, generate decompressed data by decompressing the data, transmit the decompressed data to the host processor, or store data received in connection with the request from the host processor.

In one embodiment, the controller may: in response to determining that the decompressed data and the data stored in the compressed memory pool are present at the same time, delete information on the data from the second mapping table, return a storage space of the data to the compressed memory pool, and set a dirty flag for the data.

In one embodiment, the controller may be allocated a memory space for storing the data from the temporary memory pool in response to determining that the data is not stored in the compressed memory pool.

In one embodiment, the controller may: record information on the data and the memory space in the first mapping table, and set a dirty flag for the data.

In one embodiment, the controller may: after setting the dirty flag for the data, determine whether the data is stored in the temporary memory pool based on the first mapping table, and in response to determining that the data is stored in the temporary memory pool, transmit the data to the host processor or store data received in connection with the request from the host processor in the temporary memory pool.

In one embodiment, the controller may: the request may be a fresh access request to the data, and the controller may initialize the allocated memory space.

In one embodiment, the controller may: determine whether an allocable memory space in the temporary memory pool is less than or equal to a threshold value, and in response to determining that the memory space is less than or equal to the threshold value, select a victim area from the temporary memory pool and return the victim area to the temporary memory pool.

In one embodiment, the controller may: determine whether the victim area is in a dirty state, and in response to determining that the victim area is in the dirty state, generate compressed data by compressing data in the victim area and store the compressed data in the compressed memory pool.

In one embodiment, the controller may include: an address remapper configured to determine whether the data corresponding to the address information is stored as data in an uncompressed state in the volatile memory device based on at least one mapping table of the first mapping table or the second mapping table, and convert the address information into the volatile memory address by using the at least one mapping table; and a compression controller configured to control compression of the data in an uncompressed state and control decompression of data in a compressed state.

In one embodiment, the controller may: determine locations where compressed data obtained by compressing the data in an uncompressed state and decompressed data obtained by decompressing the data in a compressed state are stored, and update the first mapping table and the second mapping table.

In one embodiment, the controller may include: a memory manager configured to secure an empty space in the volatile memory device at a request of the compression controller; and a compression and decompression module configured to compress the data in an uncompressed state or decompress the data in a compressed state at the request of the compression controller.

In one embodiment, the controller may include: a cache memory configured to store data that has been accessed or is expected to be accessed; and a memory controller configured to be connected with the volatile memory device and the cache memory.

In one embodiment, the memory manager may determine cold data out of data stored in the compressed memory pool within the volatile memory device, and the controller may include a storage controller configured to transmit the cold data to a non-volatile storage device configured to be connected to the controller.

In one embodiment, the memory manager may determine cold data out of data stored in the compressed memory pool within the volatile memory device, the compression and decompression module may decompress the cold data and generate decompressed data, and the controller may include a storage controller configured to transmit the decompressed data to a non-volatile storage device configured to be connected to the controller.

According to another aspect of the present disclosure, a computing system is disclosed. The system may include a host processor; and an electronic device, and the electronic device may include: a volatile memory device; and a controller configured to be connected with a host processor and the volatile memory device, wherein the controller may be further configured to receive a request related to data access from the host processor, determine whether data corresponding to address information is compressed based on the address information included in the request, and communicate with the volatile memory device and process the request based on a result of determining whether the data is compressed.

According to various embodiments of the present disclosure, it is possible to provide an electronic device and its structure that provide a larger memory capacity via compression.

According to various embodiments of the present disclosure, the electronic device may also transparently provide a memory compression function in addition to providing a memory.

According to various embodiments of the present disclosure, the performance of the entire computing system can be improved by allowing the host processor to be utilized for processing other than compression by providing an electronic device that takes over at least part of the compression operation function of the host processor.

According to various embodiments of the present disclosure, it is possible to eliminate input/output bottlenecks with the host processor and improve performance by providing an electronic device that implements swap-in and swap-out by directly controlling a non-volatile storage device.

According to various embodiments of the present disclosure, it is possible to exhibit a level of performance on par with systems that do not use compression at least in particular circumstances (e.g., a situation in which the size of the temporary memory pool of the volatile memory device is sufficient for operation as the instantaneous working set of data used by an application is small or has high locality, by providing a cost-effective solution) by providing a cost-effective solution.

The effects of the present disclosure are not limited to those mentioned above, and other effects that have not been mentioned will be clearly understood by those skilled in the art to which the present disclosure pertains (hereinafter referred to as a 'person of ordinary skill') from the description of the claims.

DETAILED DESCRIPTION OF THE PREFERRED EMBODIMENTS

Figure 1:
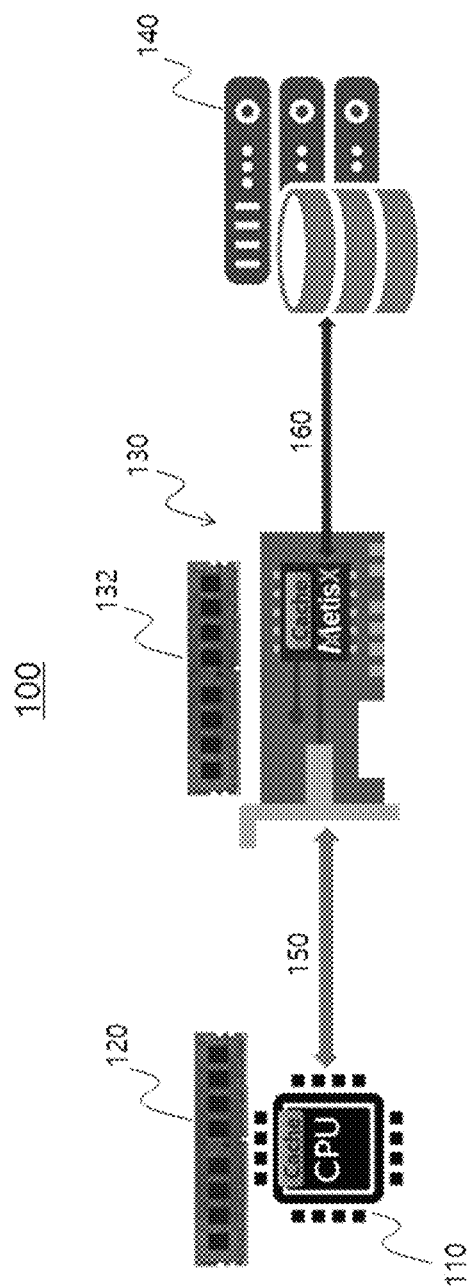
FIG. 1 is an example diagram conceptually illustrating a computing system including an electronic device in accordance with one embodiment of the present disclosure.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

FIG. 1 is an example diagram conceptually illustrating a computing system 100 including an electronic device 130 according to one embodiment of the present disclosure.

A computing system 100 in accordance with the present disclosure may be a storage server or other kind of server that may be used in a data center. As shown in FIG. 1, the computing system 100 may include a host processor 110 (e.g., x86 CPU, ARM, RISC-V), an electronic device 130, and a non-volatile storage device 140. The host processor 110 may be connected to a host memory 120. The electronic device 130 may include a volatile memory device 132.

The computing system 100 in accordance with the present disclosure may have a scalable device structure that can use the volatile memory device 132 of the electronic device 130 as an intermediate storage medium and the non-volatile storage device 140 as a final storage medium. The host processor 110 may recognize the total capacity of the non-volatile storage device 140 connected to the electronic device 130.

The host processor 110 may communicate with the electronic device 130 by using a first interface 150. The first interface 150 may be a serial interface, and may be, for example, an interface using PCIe or a compute express link (CXL) protocol. The electronic device 130 may communicate with the non-volatile storage device 140 by using a second interface 160. The second interface 160 may be a serial interface.

In the computing system 100 in accordance with the present disclosure, the first interface 150 may be a byte-addressable protocol (or byte addressing protocol), and the second interface 160 may be a block-addressable protocol (or block addressing protocol). The host processor 110 may assign addresses in bytes and read and write data to the electronic device 130. The electronic device 130 may assign addresses in blocks and read and write data to the non-volatile storage device 140. The electronic device 130 may retrieve data in blocks from the non-volatile storage device 140 based on the byte addresses and store the data in the volatile memory device 132 of the electronic device 130. The electronic device 130 may access data corresponding to the address requested by the host processor 110 out of data stored in the volatile memory device 132.

According to one embodiment, the electronic device 130 may internally have a cache for data stored in the volatile memory device 132 to improve performance.

FIG. 1 illustrates that the non-volatile storage device 140 is configured separately from the electronic device 130 for the convenience of description. However, the present disclosure is not limited thereto. For example, in the present disclosure, the non-volatile storage device 140 may be configured to be integrated with the electronic device 130.

Figure 2:
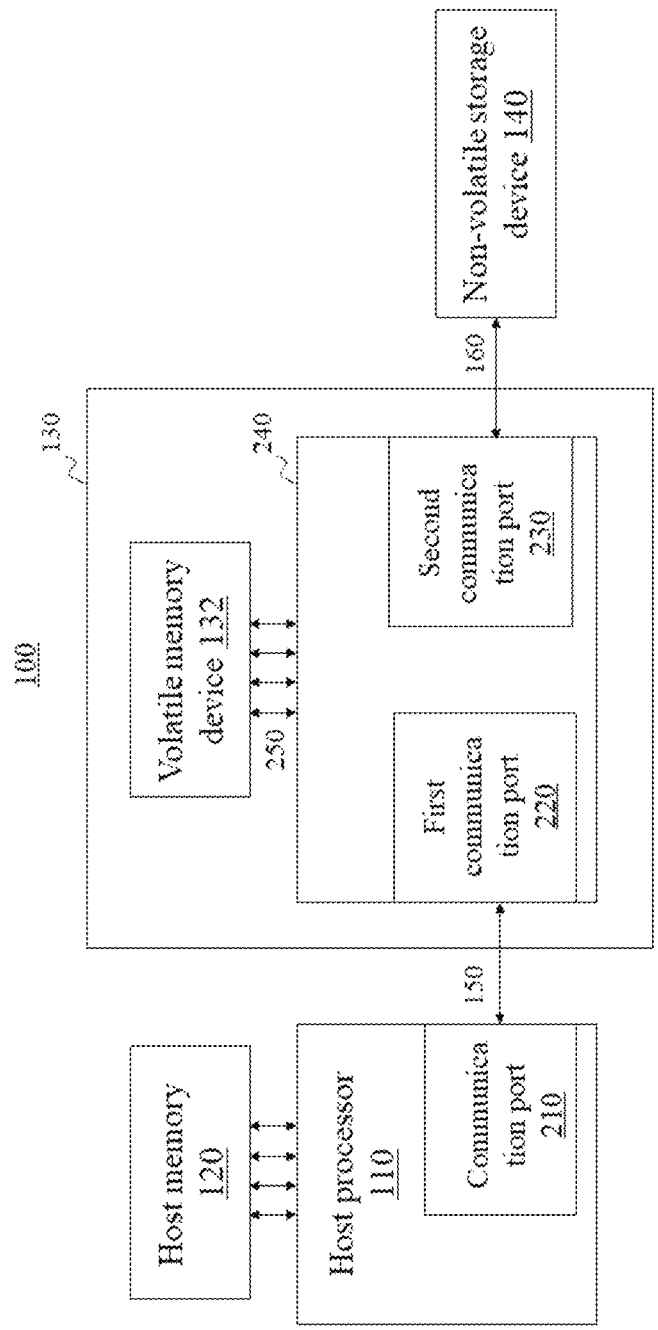
FIG. 2 is a block diagram of a computing system including an electronic device in accordance with one embodiment of the present disclosure.

FIG. 2 is a block diagram of a computing system 100 including an electronic device 130 in accordance with one embodiment of the present disclosure.

As shown in FIG. 2, the computing system 100 includes a host processor 110, an electronic device 130, and a non-volatile storage device 140. The host processor 110 may include a communication port 210. The electronic device 130 may include a volatile memory device 132 and a controller 240.

The host processor 110 may refer to a set of one or more processors. The host processor 110 may control at least one component of a device or terminal (e.g., the electronic device 130) connected to the host processor 110 by driving software (e.g., commands, programs, etc.). In addition, the host processor 110 may perform operations such as various computations, processing, data generation or processing. Further, the host processor 110 may load data or the like from various memory devices or storage devices, or store data or the like in the memory devices or storage devices.

The controller 240 may have one or more volatile memory channels, and may communicate with individual components or the volatile memory device 132 via these volatile memory channels. The volatile memory device 132 may be, for example, a DIMM-type DRAM. The controller 240 may include a first communication port 220. For example, the first communication port 220 may be a PCIe end point or a CXL end point. According to one embodiment, the controller 240 may further include a second communication port 230. For example, the second communication port 230 may be a PCIe root complex port.

The controller 240 may communicate with the host processor 110 over a first interface 150 via the first communication port 220 and the communication port 210. Further, the controller 240 may communicate with the volatile memory device 132 over a third interface 250. In addition, the controller 240 may communicate with the non-volatile storage device 140 over a second interface 160 via the second communication port 230. Here, the first interface 150 and the second interface 160 may be serial interfaces, and the third interface 250 may be a parallel interface.

The controller 240 may communicate with the host processor 110 in a first protocol. Further, the controller 240 may communicate with the volatile memory device 132 in a second protocol. Moreover, the controller 240 may communicate with the non-volatile storage device 140 in a third protocol. Here, the first protocol and the second protocol may be byte-addressable protocols that allow data to be read and written by assigning addresses in bytes, and the third protocol may be a block-addressable protocol that allows data to be read and written by assigning addresses in blocks.

The non-volatile storage device 140 may include one or more non-volatile storages. According to one embodiment, as many non-volatile storages as the interfaces allow may be connected directly to the second communication port 230. Here, the non-volatile storages may include hard disk drives (HDDs), solid-state drives (SSDs), and the like.

The controller 240 in accordance with the present disclosure may receive a request or command related to data access including address information from the host processor 110. The request may be a request for a data read or write and may be transferred via the communication port 210 and the first communication port 220. The controller 240 may determine whether data corresponding to the address information is compressed based on the address information included in the data access request. The controller 240 may communicate with the volatile memory device 132 and process the data access request based on the result of determining whether the data is compressed.

The controller 240 in accordance with the present disclosure may divide and manage the volatile memory device 132 into a temporary memory pool and a compressed memory pool. For example, the controller 240 may define and manage a first area of the volatile memory device 132 as a compressed memory pool, and define and manage a second area that is different from the first area as a temporary memory pool. When storing certain data in the volatile memory device 132, the controller 240 may determine to store the data in the compressed memory pool or the temporary memory pool depending on whether the data is compressed. Here, the temporary memory pool may also be referred to as an uncompressed memory pool.

The controller 240 may manage mapping tables in which the address information of the data stored in the volatile memory device 132 is recorded. According to one embodiment, the controller 240 may separately manage a mapping table associated with the temporary memory pool (hereinafter referred to as a 'first mapping table') and a mapping table associated with the compressed memory pool (hereinafter referred to as a 'second mapping table'). According to another embodiment, the controller 240 may consolidate and manage the mapping tables associated with the temporary memory pool and the compressed memory pool as one table.

The controller 240 in accordance with the present disclosure may determine whether data is stored in the temporary memory pool based on the first mapping table. The controller 240 may transmit the data to the host processor 110 in response to determining that the data is stored in the temporary memory pool. If the request from the host processor 110 is a write request, the controller 240 may set a dirty flag for the data stored in the temporary memory pool.

In response to determining that the data is not stored in the temporary memory pool, the controller 240 may determine whether the data is stored in the compressed memory pool based on the second mapping table. In response to determining that the data is stored in the compressed memory pool, the controller 240 may generate decompressed data by decompressing the data. The controller 240 may transmit the decompressed data to the host processor 110 or may store the data received in connection with the request from the host processor.

According to one embodiment, the controller 240 may determine whether to delete the compressed data after the decompressed data has been stored in the temporary memory pool. The controller 240 may determine to delete the compressed data in response to determining that the decompressed data and the data stored in the compressed memory pool are present at the same time. In this case, the controller 240 may delete information on the data from the second mapping table. The controller 240 may return the storage space of the data to the compressed memory pool and set a dirty flag for the data. According to another embodiment, after transmitting the decompressed data, the controller 240 may retain the compressed data.

The controller 240 may determine that the data is not stored in the temporary memory pool and the compressed memory pool (i.e., fresh access). In response to this determination, the controller 240 may be allocated a memory space for storing the data from the temporary memory pool. The controller 240 may record information on the data and memory space in the first mapping table. The controller 240 may set a dirty flag for the data. Thereafter, the controller 240 may determine whether the corresponding data is stored in the temporary memory pool based on the first mapping table again. Since the memory space for storing the data has been allocated from the temporary memory pool, the controller 240 may determine that the data is stored in the temporary memory pool. In response to this determination, the controller 240 may store the data requested by the host processor to be written in the temporary memory pool, or transmit the data requested by the host processor to be read to the host processor. If the request from the host processor 110 is a fresh access request to the corresponding data, the controller 240 may initialize the allocated memory space.

The controller 240 in accordance with the present disclosure may secure a temporary memory pool. The controller 240 may determine whether an allocable memory space in the temporary memory pool is less than or equal to a threshold value. In response to determining that the memory space is less than or equal to the threshold value, the controller 240 may select a victim area from the temporary memory pool and return the victim area to the temporary memory pool. Further, the controller 240 may determine whether the victim area is in a dirty state. In response to determining that the victim area is in the dirty state, the controller 240 may generate compressed data by compressing the data of the victim area. The controller 240 may store the compressed data in the compressed memory pool.

Figure 3:
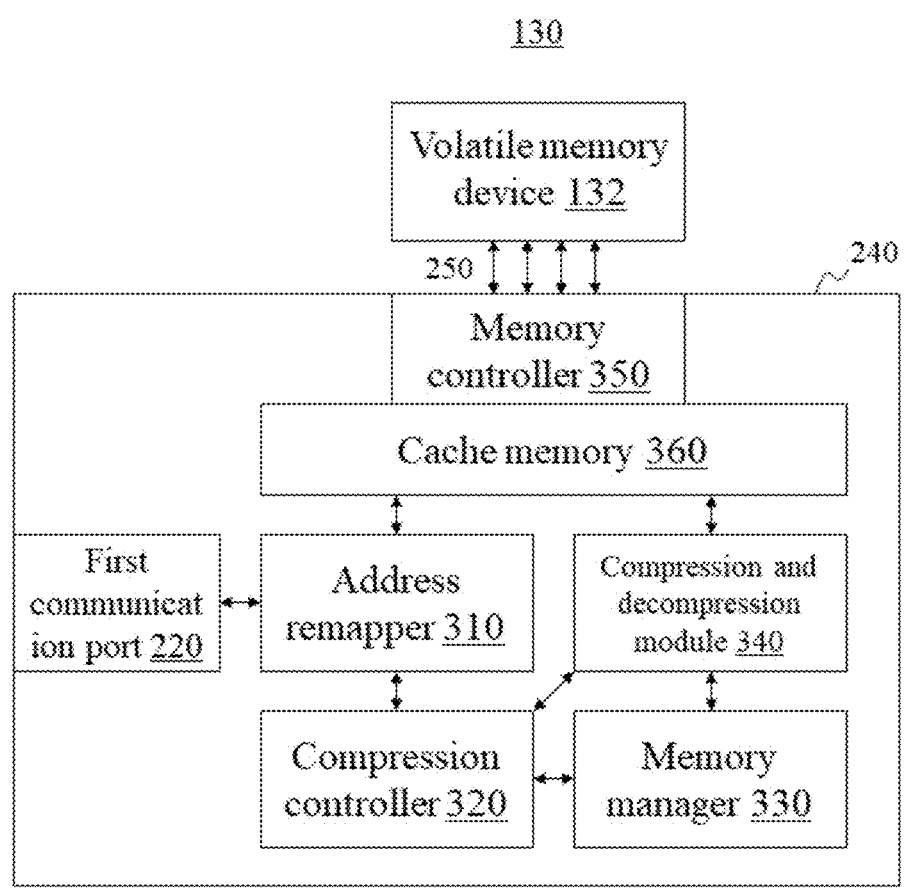
FIG. 3 is a block diagram of a controller in accordance with one embodiment of the present disclosure.

FIG. 3 is a block diagram of a controller 240 in accordance with one embodiment of the present disclosure.

As shown in FIG. 3, the controller 240 may include an address remapper 310 and a compression controller 320. The address remapper 310 may receive a read or write request including address information from the host processor 110 via a first communication port 220. The address remapper 310 may determine whether data corresponding to the address information included in the request is stored as data in an uncompressed state in the volatile memory device 132 based on the mapping tables.

If it is determined that the data is stored as data in an uncompressed state, the address remapper 310 may convert the address information included in the request into a physical address (or volatile memory address) of the volatile memory device 132 by using the mapping tables. The address remapper 310 may access the volatile memory device 132 by using the converted address and complete the read or write operation requested by the host processor 110. If it is determined that the data is not stored as data in an uncompressed state, the address remapper 310 may transfer the request from the host processor 110 to the compression controller 320.

The compression controller 320 may control the compression of the data in an uncompressed state. Conversely, the compression controller 320 may control the decompression of data in a compressed state. The compression controller 320 may also be referred to as a compression and decompression controller. The compression controller 320 may determine the locations where compressed data obtained by compressing data in an uncompressed state and decompressed data obtained by decompressing data in a compressed state are stored.

The compression controller 320 may determine whether the data corresponding to the address information included in the request is stored as data in a compressed state in the volatile memory device 132 based on the mapping tables. If it is determined that the data is stored as data in a compressed state, the compression controller 320 may control the corresponding data to be decompressed in the temporary memory pool. The compression controller 320 may update the first mapping table associated with the temporary memory pool of the volatile memory device 132 and the second mapping table associated with the compressed memory pool of the volatile memory device. The compression controller 320 may update the mapping table to indicate that the decompressed data is stored in a particular location of the temporary memory pool, and may update the mapping table to indicate that the compressed data is stored in a particular location of the compressed memory pool. Thereafter, the address remapper 310 may convert the address information included in the request into a physical address (or volatile memory address) of the volatile memory device 132 by using the updated mapping tables.

The controller 240 in accordance with the present disclosure may further include a memory manager 330 and a compression and decompression module 340. The memory manager 330 may secure an empty space in the volatile memory device 132 according to a request or determination by the compression controller 320. Further, the memory manager 330 may divide and manage the volatile memory device 132 into the temporary memory pool and the compressed memory pool. The compression and decompression module 340 may decompress data in a compressed state or compress data in an uncompressed state according to a request or determination by the compression controller 320. The compression and decompression module 340 may include a compressor for compressing data and a decompressor for decompressing data.

The controller 240 in accordance with the present disclosure may further include a memory controller 350 and a cache memory 360. The cache memory 360 may be configured to store data that has ever been accessed or is expected to be accessed. The memory controller 350 may be connected to the volatile memory device 132 and the cache memory 360. The memory controller 350 may be configured to access the volatile memory device 132 and allow data to be read or written.

The address remapper 310, the compression controller 320, the memory manager 330, the compression and decompression module 340, and the memory controller 350 shown in FIG. 3 may each be implemented as a hardware device or software code. According to one embodiment, the address remapper 310 may be implemented as a hardware device, and the other components may be implemented as software code. According to one embodiment, the compression and decompression module 340 may be implemented as a mixture of hardware devices and software code. For example, the decompressor of the compression and decompression module 340 may be implemented as hardware, and the compressor may be implemented as software. In addition, FIG. 3 illustrates the components of the controller 240 by way of example, and the present disclosure is not limited thereto. For example, it may be implemented such that some of the components shown in FIG. 3 may be omitted or functions of particular components may be included in other components.

Figure 4:
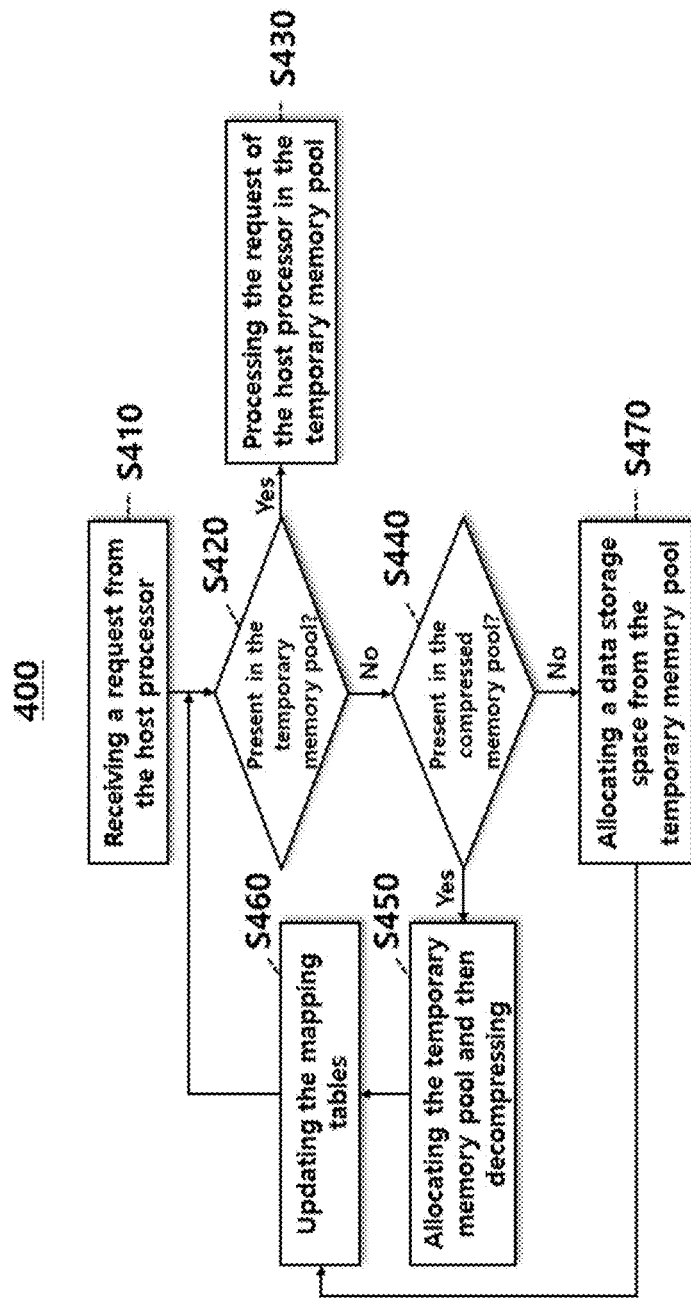
FIG. 4 is a flowchart regarding an operation in which a controller processes a request related to data access according to one embodiment of the present disclosure.

FIG. 4 is a flowchart 400 regarding an operation in which a controller 240 processes a request related to data access according to one embodiment of the present disclosure.

The controller 240 may receive a request related to data access from the host processor 110 (S410). The request from the host processor 110 may be a data read or write request. According to one embodiment, the address remapper 310 may receive the corresponding request via the communication port 210 and the first communication port 220. The request received by the address remapper 310 may include address information.

Next, the controller 240 may determine whether data corresponding to the request is stored in the temporary memory pool (S420). According to one embodiment, the address remapper 310 may determine whether a compression unit corresponding to the address information included in the request is present in an uncompressed state in the non-volatile memory by referring to the first mapping table. The compression unit may be selected to be of an appropriate size, taking compression performance and time for compression and decompression into account. For example, the compression unit may be 4 KB. In this case, uncompressed data may be managed in units of 4 KB in the temporary memory pool of the volatile memory device 132.

If it is determined in the determination step S420 that the data corresponding to the request is stored in the temporary memory pool, the controller 240 may process the request of the host processor 110 in the temporary memory pool (S430). According to one embodiment, the address remapper 310 may determine that the data corresponding to the request is stored in the temporary memory pool. In other words, the address remapper 310 may determine that the corresponding data is in the volatile memory device 132 in an uncompressed state. In this case, the address remapper 310 may convert the address information included in the request into a physical address (or volatile memory address) of the volatile memory device 132 by using the first mapping table. The address remapper 310 may access the volatile memory device 132 by using the converted address and complete the read or write operation requested by the host processor 110.

If the corresponding request is a write request, the address remapper 310 may set a dirty flag, which indicates that the data has been updated, for the metadata of the corresponding data. The data for which the dirty flag has been set may be compressed by a subsequent process and then stored.

If it is determined in the determination step S420 that the data corresponding to the request is not stored in the temporary memory pool, the controller 240 may determine whether the corresponding data is stored in the compressed memory pool (S440). According to one embodiment, the address remapper 310 may determine that the data corresponding to the request is not stored in the temporary memory pool. In other words, the address remapper 310 may determine that the corresponding data is not present in an uncompressed state in the volatile memory device 132. In this case, the address remapper 310 may transfer the request from the host processor 110 to the compression controller 320. The compression controller 320 may determine whether the data corresponding to the address information included in the request is stored in the compressed memory pool based on the second mapping table.

If it is determined in the determination step S440 that the corresponding data is stored in the compressed memory pool, the controller 240 may allocate the temporary memory pool and then execute decompression (S450). According to one embodiment, the compression controller 320 may determine that the data corresponding to the request is stored in the compressed memory pool. In other words, the compression controller 320 may determine that the corresponding data is present in a compressed state in the volatile memory device 132. In this case, the compression controller 320 may request the memory manager 330 to allocate a temporary area from the temporary memory pool.

The memory manager 330 may allocate a temporary area from the temporary memory pool of the volatile memory area at the request by the compression controller 320. Once the allocation of the temporary area is completed, the compression controller 320 may request the compression and decompression module 340 (or the decompressor included in the compression and decompression module 340) to decompress the data. The compression and decompression module 340 may decompress and store the data in the temporary area.

After the completion of the decompression, the controller 240 may update the mapping tables (S460). According to one embodiment, the compression controller 320 may update the first mapping table by recording the address of the temporary area. Thereafter, the compression controller 320 may transfer the corresponding request to the address remapper 310.

Next, the determination step S420 may be executed again. The address remapper 310 may determine whether the data is stored in the temporary memory pool based on the first mapping table. According to the processing in the previous steps S450 and S460, the address remapper 310 may determine that the data is stored in the temporary memory pool. According to this determination, the address remapper 310 may process the request of the host processor in the temporary memory pool (S430). Specifically, the address remapper 310 may convert the address information included in the request into a physical address of the temporary area of the volatile memory device 132 by using the updated first mapping table, and may access the volatile memory device 132 by using the converted address and complete the read or write operation requested by the host processor 110.

In steps S450 and S460, both compressed data and uncompressed data (i.e., decompressed data) may be present. The controller 240 in accordance with the present disclosure may determine whether compressed data and uncompressed data are present at the same time. Further, if it is determined that compressed data and uncompressed data are present at the same time, the controller 240 may determine whether to delete the compressed data. The controller 240 may determine whether to delete the compressed data according to the frequencies by the types of requests received from the host processor 110. For example, if there are more write requests, the controller 240 may determine to delete the compressed data, and if there are more read requests, the controller 240 may determine to keep the compressed data.

According to one embodiment, the compression controller 320 may determine to delete the compressed data. In this case, the memory manager 330 may delete the information on the data present in a compressed state from the second mapping table according to the determination by the compression controller 320. Further, the memory manager 330 may return the memory area in which the corresponding data is stored to the compressed memory pool. A dirty flag may be set for the metadata of the uncompressed data. Thereafter, if the uncompressed data is selected as a victim to secure a temporary memory pool, the controller 240 may compress and store the corresponding uncompressed data again and update the second mapping table.

According to another embodiment, the compression controller 320 may determine to retain the compressed data. In this case, if the host processor 110 performs only reads and no writes, it may be advantageous in that the uncompressed data does not need to be compressed again when the memory area in which the corresponding uncompressed data is stored is returned to the temporary memory pool.

If it is determined in the determination step S440 that the corresponding data is not stored in the compressed memory pool, the controller 240 may allocate a data storage space from the temporary memory pool (S470). According to one embodiment, the compression controller 320 may determine that the data corresponding to the request is not stored in the compressed memory pool. In other words, the compression controller 320 may determine that the corresponding data is not present in a compressed state in the volatile memory device 132. For example, the case where the data corresponding to the request is fresh data that is neither stored in an uncompressed state nor stored ever in a compressed state may correspond to this step S470.

The compression controller 320 may request the memory manager 330 to allocate memory of a compression unit size (e.g., 4 KB) from the temporary memory pool. The memory manager 330 may allocate a memory space from the temporary memory pool at the request by the compression controller 320.

The controller 240 may allocate the data storage space from the temporary memory pool and then update the mapping table (S460). The compression controller 320 may record the address of the allocated memory area onto the first mapping table. A dirty flag may be set for the metadata of the data stored in the memory space. Since the freshly accessed data is not present in the compressed memory pool of the volatile memory device 132, the dirty flag is set so as to be stored at the time of being a victim. If the request from the host processor 110 is a fresh access request, the compression controller may initialize the allocated memory space. For example, the compression controller may fill the allocated memory space with '0'.

Next, the determination step S420 may be executed again. The address remapper 310 may determine whether the data is stored in the temporary memory pool based on the first mapping table. Since the data was stored in the memory space of the temporary memory pool in the previous step S470, the address remapper 310 may determine that the data is stored in the temporary memory pool. According to this determination, the address remapper 310 may access the volatile memory device 132 by using the converted address and complete the read or write operation requested by the host processor 110 (S430).

Figure 5:
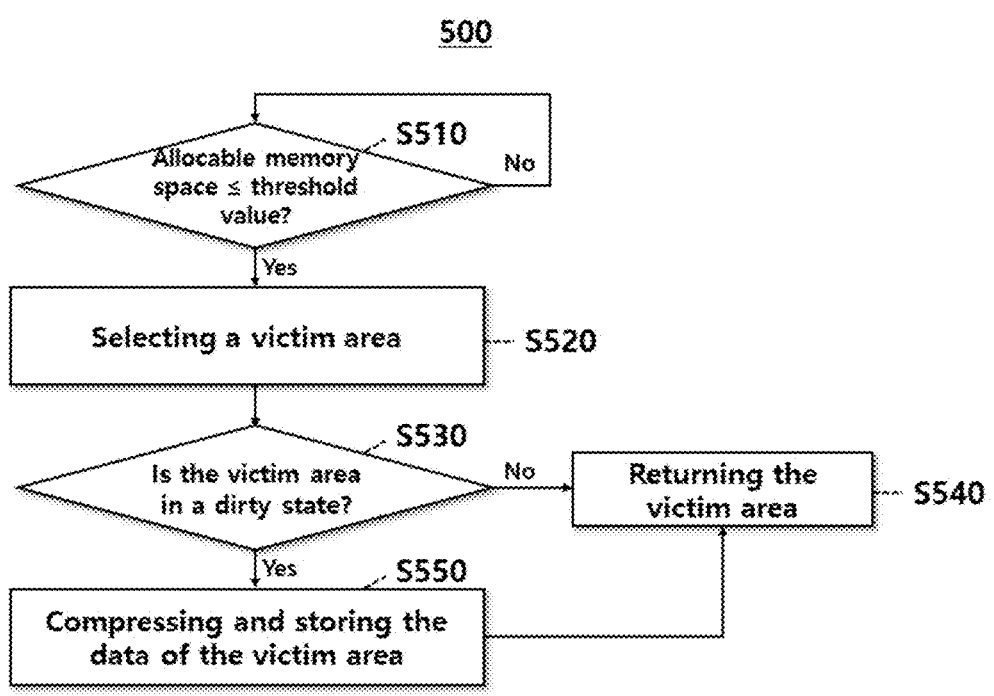
FIG. 5 is a flowchart regarding an operation in which a controller secures a temporary memory pool according to one embodiment of the present disclosure.

FIG. 5 is a flowchart 500 regarding an operation in which a controller 240 secures a temporary memory pool according to one embodiment of the present disclosure.

When data read and write processes are performed, there may arise a situation in which a new memory space cannot be allocated anymore as the temporary memory pool is all in use. In order to delete existing data that was being used and update it with new data, the controller 240 may execute an algorithm for selecting an optimal victim area. This allows data to be chosen so that, even if deleted, the impact on performance can be minimal. In addition, if the selected victim area is in a dirty state (i.e., if it is set with the dirty flag), it is first compressed and stored and then deleted, to maintain data consistency.

The controller 240 may determine whether the allocable memory space is less than or equal to a threshold value (S510). According to one embodiment, the memory manager 330 may periodically or aperiodically check the allocable memory space in the temporary memory pool of the volatile memory device 132. The memory manager 330 may determine whether the allocable memory space is less than or equal to a threshold value (e.g., 20%). If it is determined in the determination step S510 that the allocable memory space exceeds the threshold value, the controller 240 may execute the determination step S510 again after a predetermined time has elapsed.

If it is determined in the determination step S510 that the allocable memory space is less than or equal to the threshold value, the controller 240 may select a victim area (S520). According to one embodiment, if the memory manager 330 determines that the allocable memory space in the temporary memory pool is less than or equal to the threshold value, it may send an alarm to the compression controller 320. The compression controller 320 may select a victim area from the temporary memory pool of the volatile memory device 132. In other words, the compression controller 320 may select a predetermined area as the victim area out of the previously used areas of the temporary memory pool. The compression controller 320 may request the memory manager 330 to deallocate the victim area. The memory manager 330 may return the victim area to the temporary memory pool at the request of the compression controller 320.

Next, the controller 240 may determine whether the victim area is in a dirty state (S530). According to one embodiment, the compression controller 320 may determine whether a dirty flag is set for the metadata of the data corresponding to the victim area.

If it is determined in the determination step S530 that the victim area is not in the dirty state, the controller 240 may return the victim area (S540). According to one embodiment, if it is determined that the victim area is not in the dirty state, the compression controller 320 may request the memory manager 330 to return the victim area. The memory manager 330 may return the victim area to the temporary memory pool at the request of the compression controller 320.

If it is determined in the determination step S530 that the victim area is in the dirty state, the controller 240 may compress and store the data of the victim area (S550). According to one embodiment, if it is determined that the victim area is in the dirty state, the compression controller 320 may request the memory manager 330 to allocate a memory space for storing the data of the victim area. The memory manager 330 may allocate a memory space from the compressed memory pool at the request of the compression controller 320. The compression controller 320 may request the compression and decompression module 340 to compress the data of the victim area. The compression and decompression module 340 may compress and store the data of the victim area in the allocated memory space at the request of the compression controller 320.

Once the storage of the data of the victim area is completed (S550), the controller 240 may return the victim area (S540). At this time, if compressed data having existing data is present, the controller 240 may delete the corresponding compressed data from the second mapping table, register the location of the compressed data having the data of the victimized area in the second mapping table, and return the memory space in which the compressed data is stored to the compressed memory pool.

At least part of the operation of securing the temporary memory pool according to FIG. 5 may be executed in the background. For example, the step of setting the victim area (S520) may be executed in the background.

Figure 6:
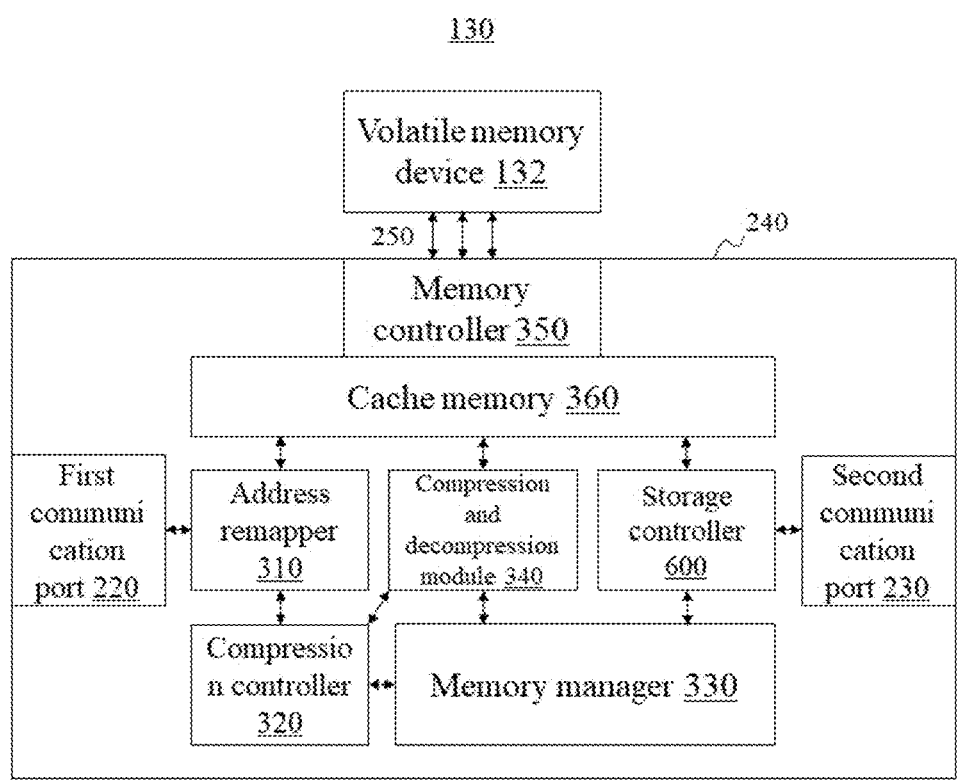
FIG. 6 is a block diagram of a controller in accordance with another embodiment of the present disclosure.
Figure 7:
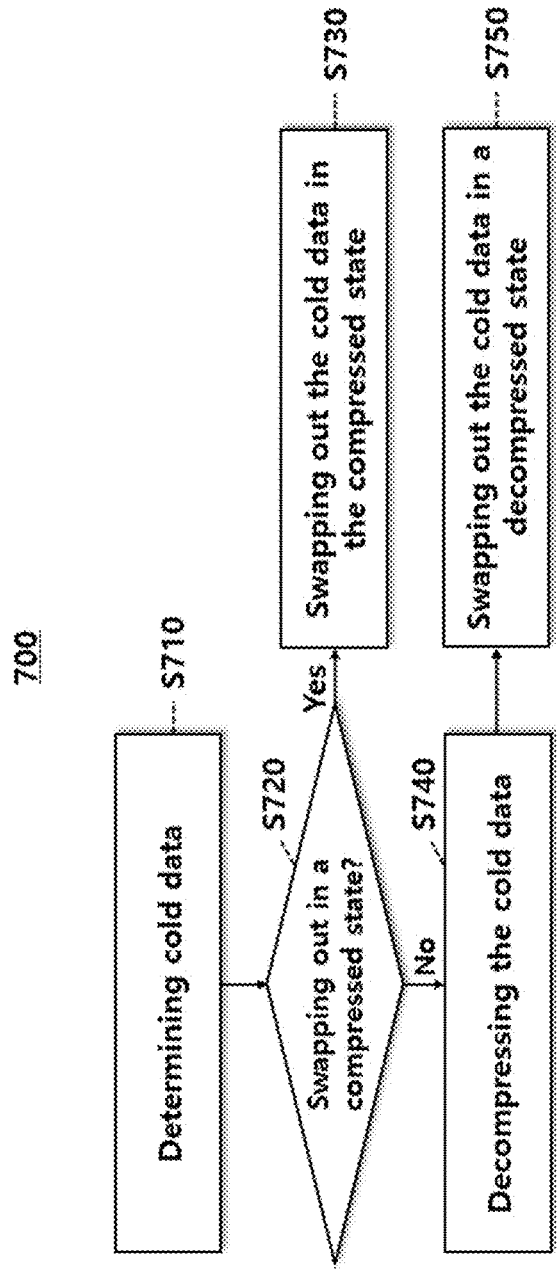
FIG. 7 is a flowchart regarding an operation in which a controller executes a swap-out according to another embodiment of the present disclosure.

FIG. 6 is a block diagram of a controller 240 in accordance with another embodiment of the present disclosure, and FIG. 7 is a flowchart 700 regarding an operation in which a controller 240 executes a swap-out according to another embodiment of the present disclosure.

The electronic device 130 in accordance with the present embodiment may swap out the data stored in the volatile memory device 132 to a non-volatile storage device 140. Some components of the embodiment according to FIG. 6 may be the same as or similar to some components of the embodiment according to FIG. 3, and detailed descriptions of the same or corresponding components will be omitted.

As shown in FIG. 6, the controller 240 may further include a storage controller 600. The storage controller 600 may be configured to drive the nonvolatile storage device 140 via the second communication port 230, designate addresses in block units, and perform data reads or writes.

The controller 240 may directly execute a swap-out for the non-volatile storage device 140. In connection with this operation, the controller 240 may determine cold data out of the data stored in the compressed memory pool within the volatile memory device 132 (S710). According to one embodiment, the memory manager 330 may determine the cold data from the currently allocated compressed memory pool based on information such as time information when the memory was allocated and the frequency of page accesses. The cold data may refer to data that is not frequently accessed and can thus be swapped out to another device, out of the data stored in the compressed memory pool.

Next, the controller 240 may determine whether to swap out the cold data in a compressed state (S720). This determination may be based on the frequency of accesses of the host processor 110 to the cold data to be swapped out or other information.

If it is determined in the determination step S720 to swap out in a compressed state, the controller 240 may swap out the cold data in the compressed state (S730). According to one embodiment, the storage controller 600 transfers the cold data present in the compressed memory pool to the non-volatile storage device 140 via the second communication port 230 in the compressed state.

If it is determined in the determination step S720 not to swap out in the compressed state, the controller 240 may decompress the cold data (S740). According to one embodiment, the compression controller 320 may be allocated a temporary buffer from the temporary memory pool by requesting the memory manager 330. The compression and decompression module 340 may generate decompressed data by decompressing the cold data at the request of the compression controller 320 and store the decompressed data in the temporary buffer.

Next, the controller 240 may swap out the cold data in the decompressed state (S750). According to one embodiment, the storage controller 600 may transmit the decompressed data stored in the temporary buffer to the non-volatile storage device 140. According to the embodiment in which decompressed data is transmitted, a delay may be reduced if an access to the corresponding data is needed again later, compared to the embodiment in which compressed data is transmitted.

According to the present disclosure, it is possible to selectively swap out data that is less required to be retained in the volatile memory device 132 in terms of performance to the non-volatile storage device 140. According to the present disclosure, overall memory efficiency can be improved by performing a primary swap-out from the host memory 120 to the volatile memory device 132 and a secondary swap-out from the volatile memory device 132 to the non-volatile storage device 140. According to the present disclosure, it is possible to reduce the management burden of the host operating system and improve the performance of the entire computing system 100 by allowing the electronic device 130 to process the swap-out from the volatile memory device 132 to the non-volatile storage device 140.

The methods in accordance with the present disclosure may be computer-implemented methods. Although each step of the corresponding methods has been shown and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the host processor 110, the electronic device 130 or the computing system 100 including the same in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

What is claimed is:

1. An electronic device for compressing and storing data, comprising:
    a volatile memory device comprising a compressed memory pool in which data in a compressed state is stored and a temporary memory pool in which data in an uncompressed state is stored; and
    a controller configured to communicate with a host processor and the volatile memory device in a byte-addressable protocol that allows data to be read and written by designating addresses in byte units,
    wherein the controller is further configured to:
    receive a request related to data access from the host processor,
    based on address information included in the request, determine whether data is compressed, as to whether data corresponding to the address information is stored in an uncompressed state in the temporary memory pool of the volatile memory device or in a compressed state in the compressed memory pool of the volatile memory device,
    communicate with the volatile memory device and process the request based on a result of determining whether the data is compressed, and
    divide and manage the volatile memory device into the temporary memory pool and the compressed memory pool and, manage a first mapping table associated with the temporary memory pool and a second mapping table associated with the compressed memory pool.

2. The electronic device of claim 1, wherein the controller is further configured to:
    determine whether the data corresponding to the address information is stored in the temporary memory pool based on the first mapping table, and
    in response to determining that the data is stored in the temporary memory pool, transmit the data to the host processor or store data received in connection with the request from the host processor in the temporary memory pool.

3. The electronic device of claim 2, wherein the request is a write request, and
    the controller is further configured to set a dirty flag for the data stored in the temporary memory pool, in response to having stored the data received in connection with the request from the host processor in the temporary memory pool.

4. The electronic device of claim 2, wherein the controller is further configured to:
    in response to determining that the data corresponding to the address information is not stored in the temporary memory pool, determine whether the data is stored in the compressed memory pool based on the second mapping table, and
    in response to determining that the data is stored in the compressed memory pool, generate decompressed data by decompressing the data, transmit the decompressed data to the host processor, or store data received in connection with the request from the host processor.

5. The electronic device of claim 4, wherein the controller is further configured to:
    in response to determining that the decompressed data and the data stored in the compressed memory pool are present at the same time, delete information on the data from the second mapping table, return a storage space of the data to the compressed memory pool, and set a dirty flag for the data.

6. The electronic device of claim 4, wherein the controller is further configured to:
    be allocated a memory space for storing the data from the temporary memory pool in response to determining that the data is not stored in the compressed memory pool.

7. The electronic device of claim 6, wherein the controller is further configured to:
    record information on the data and the memory space in the first mapping table, and set a dirty flag for the data.

8. The electronic device of claim 7, wherein the controller is further configured to:
    after setting the dirty flag for the data, determine whether the data is stored in the temporary memory pool based on the first mapping table, and
    in response to determining that the data is stored in the temporary memory pool, transmit the data to the host processor or store data received in connection with the request from the host processor in the temporary memory pool.

9. The electronic device of claim 7, wherein the request is a fresh access request to the data, and
    the controller is further configured to initialize the allocated memory space.

10. The electronic device of claim 1, wherein the controller is further configured to:
    determine whether an allocable memory space in the temporary memory pool is less than or equal to a threshold value, and
    in response to determining that the memory space is less than or equal to the threshold value, select a victim area from the temporary memory pool and return the victim area to the temporary memory pool.

11. The electronic device of claim 10, wherein the controller is further configured to:
    determine whether the victim area is in a dirty state, and
    in response to determining that the victim area is in the dirty state, generate compressed data by compressing data in the victim area and store the compressed data in the compressed memory pool.

12. The electronic device of claim 1, wherein the controller comprises:
    an address remapper configured to determine whether the data corresponding to the address information is stored as data in an uncompressed state in the volatile memory device based on at least one mapping table of the first mapping table or the second mapping table, and convert the address information into the volatile memory address by using the at least one mapping table; and
    a compression controller configured to control compression of the data in an uncompressed state and control decompression of data in a compressed state.

13. The electronic device of claim 12, wherein the compression controller is further configured to:
   determine locations where compressed data obtained by compressing the data in an uncompressed state and decompressed data obtained by decompressing the data in a compressed state are stored, and
   update the first mapping table and the second mapping table.

14. The electronic device of claim 12, wherein the controller further comprises:
   a memory manager configured to secure an empty space in the volatile memory device at a request of the compression controller; and
   a compression and decompression module configured to compress the data in an uncompressed state or decompress the data in a compressed state at the request of the compression controller.

15. The electronic device of claim 14, wherein the controller further comprises:
   a cache memory configured to store data that has been accessed or is expected to be accessed; and
   a memory controller configured to be connected with the volatile memory device and the cache memory.

16. The electronic device of claim 14, wherein the memory manager determines cold data out of data stored in the compressed memory pool within the volatile memory device, and
   the controller further comprises a storage controller configured to transmit the cold data to a non-volatile storage device configured to be connected to the controller.

17. The electronic device of claim 14, wherein the memory manager determines cold data out of data stored in the compressed memory pool within the volatile memory device,
   the compression and decompression module decompresses the cold data and generates decompressed data, and
   the controller further comprises a storage controller configured to transmit the decompressed data to a non-volatile storage device configured to be connected to the controller.

18. A computing system comprising:
   a host processor; and
   an electronic device,
   wherein the electronic device comprises:
   a volatile memory device comprising a compressed memory pool in which data in a compressed state is stored and a temporary memory pool in which data in an uncompressed state is stored; and
   a controller configured to communicate with a host processor and the volatile memory device in a byte-addressable protocol that allows data to be read and written by designating addresses in byte units, and
   wherein the controller is further configured to:
   receive a request related to data access from the host processor,
   based on address information included in the request, determine whether data is compressed, as to whether data corresponding to the address information is stored in an uncompressed state in the temporary memory pool of the volatile memory device or in a compressed state in the compressed memory pool of the volatile memory device,
   communicate with the volatile memory device and process the request based on a result of determining whether the data is compressed, and
   divide and manage the volatile memory device into the temporary memory pool and the compressed memory pool and, manage a first mapping table associated with the temporary memory pool and a second mapping table associated with the compressed memory pool.

* * * * *